United States Patent [19]

Frank

[11] Patent Number: 5,653,416

[45] Date of Patent: Aug. 5, 1997

[54] ARRANGEMENT FOR THE STABLE CONNECTION OF TWO DOMESTIC MACHINES STACKED ONE ABOVE THE OTHER

[75] Inventor: Michael Frank, Schorndorf, Germany

[73] Assignee: Whirlpool Europe B.V., Veldhoven, Netherlands

[21] Appl. No.: 386,971

[22] Filed: Feb. 10, 1995

[30] Foreign Application Priority Data

Feb. 12, 1994 [DE] Germany ............... 9402368 U

[51] Int. Cl.⁶ ........................................ F16M 11/00
[52] U.S. Cl. .................... 248/682; 248/681; 312/107
[58] Field of Search ...................... 248/681, 680, 248/682, 677, 205.3, 506, 501, 502, 503; 312/107, 111, 198, 236, 265.5, 271

[56] References Cited

U.S. PATENT DOCUMENTS

| | | | |
|---|---|---|---|
| 3,012,762 | 12/1961 | Norris | 312/107 |
| 4,433,881 | 2/1984 | Witten et al. | 312/198 |
| 4,680,948 | 7/1987 | Rummel et al. | 312/198 |
| 5,137,340 | 8/1992 | Casley et al. | 312/107 |
| 5,308,253 | 5/1994 | Maki | 248/205.3 |

FOREIGN PATENT DOCUMENTS

| | | |
|---|---|---|
| GM1907416 | 9/1964 | Germany. |
| 3329615A1 | 2/1985 | Germany. |
| 3827789A1 | 2/1990 | Germany. |
| 3827790C2 | 2/1990 | Germany. |

*Primary Examiner*—Leslie A. Braun
*Assistant Examiner*—Willie Berry, Jr.
*Attorney, Agent, or Firm*—Thomas A. Schwyn; Mark A. Davis

[57] ABSTRACT

An arrangement for the stable connection of two home appliances stacked one above the other, particularly a washing machine and a drier comprises two vertically displaceable supporting feet (21) provided with vertical recesses and fixed to the bottom of the upper appliance, and two vertically protruding connection elements, fixed to the worktop of the lower appliance, which are adapted to be introduced into the recesses of supporting feet when the two appliances are stacked one above the other.

16 Claims, 1 Drawing Sheet

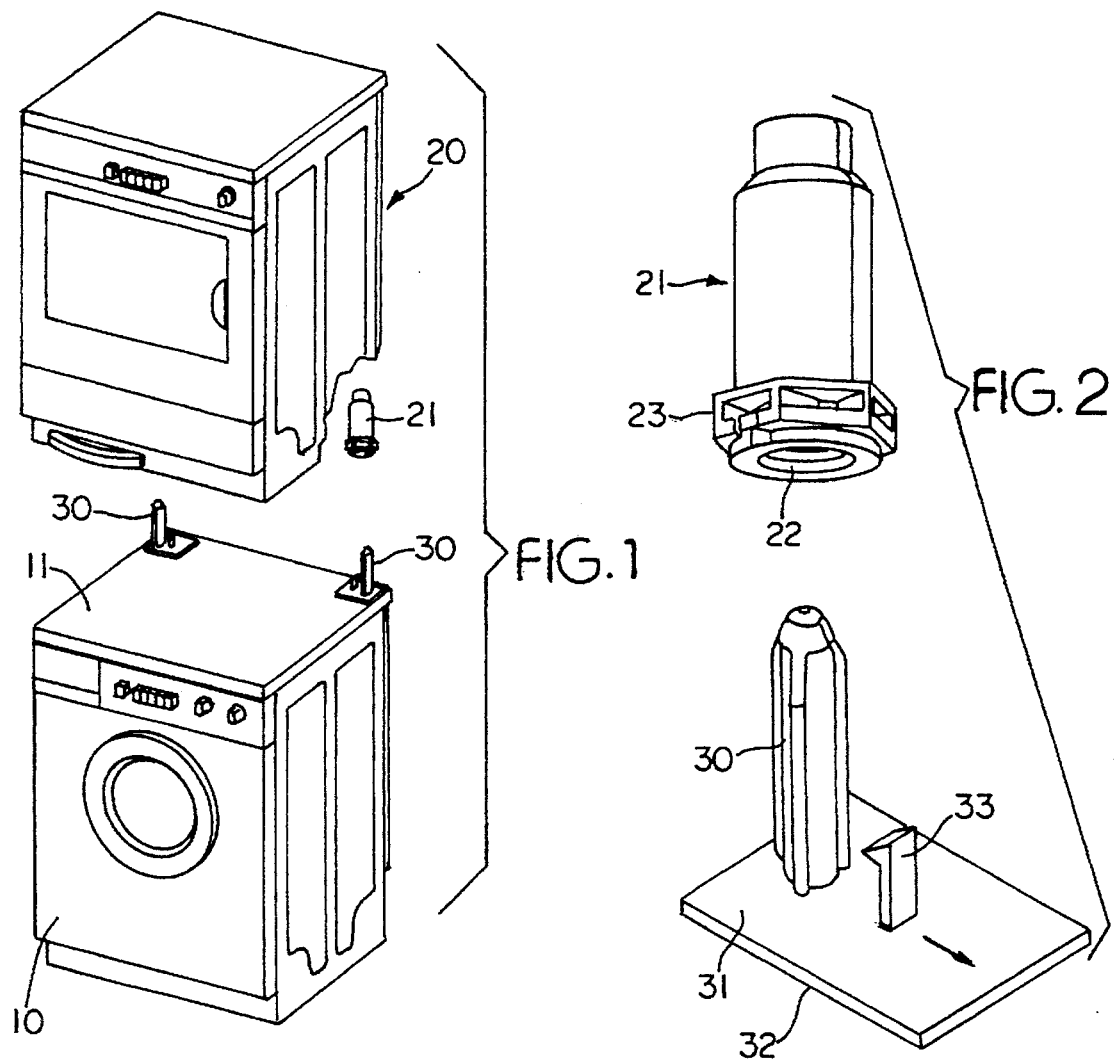

ARRANGEMENT FOR THE STABLE CONNECTION OF TWO DOMESTIC MACHINES STACKED ONE ABOVE THE OTHER

BACKGROUND OF THE INVENTION

1. Field of the Invention

The invention relates to an arrangement for the stable connection of two domestic machines stacked one above the other, more especially a washing machine and a drier to form a washer-cum-drier stack, the lower machine having an upper worktop and the attached machine having vertically displaceable supporting feet.

2. Description of the Related Art

Various arrangements of this type are known, but they require a considerable number of component parts and considerable assembly work. Thus, DE 33 29 615 A1 discloses an arrangement, wherein means for receiving the supporting feet of the upper machine are secured in bores in the worktop of the lower machine, some of the receiving means receiving the facing supporting foot vertically, while the supporting feet have to be introduced horizontally for the remaining receiving means. If the machines wobble, these receiving means do not fully ensure that the upper machine remains connected to the lower machine.

SUMMARY OF THE INVENTION

DE 38 27 789 A1 and DE 38 27 790 C2 disclose arrangements, wherein four Z-shaped mounting brackets are connected to the worktop of the lower machine. The base plates of the supporting feet are introduced into these mounting brackets, so that the mounting brackets are firmly screwed in position when the supporting feet are screwed into the frame or into an end plate of the upper machine. The junction point between the lower machine and the upper machine is covered by means of attachable screens. However, the number of component parts and the assembly work for connecting the machines which are stacked one above the other are considerable in such case and require adaptations, at least to the lower machine, for an upper machine to be selectively mounted thereon.

DE-GM 19 07 416 also discloses a firm screw-connection for the machines which are to be stacked one above the other. In such case, an intermediate frame is used, which has threaded screws, which protrude upwardly and downwardly and are introduced into bores in the machine frames. The intermediate frame is securedly connected to the two machines by means of nuts which have been screwed thereon. This type of connection is absolutely stable, but it requires a complicated intermediate frame, since the latter has to provide access to the connection points. Furthermore, the machine frames which face one another have to be provided with the appropriate receiving means for receiving the threaded screws of the intermediate frame.

It is an object of the invention to provide an arrangement of the initially mentioned type, which produces a stable connection between the two machines, which are stacked one above the other, by means of simple and easily mountable component parts.

This object is achieved, according to the invention, in that the supporting feet are provided with a vertical recess, in that at least two vertically protruding connection elements are connectable and connected to the worktop of the lower machine, and in that the connection elements are introduced into the recesses of supporting feet when the machines are aligned with each other and stacked one above the other.

The hollow supporting feet provide a long length for engagement with the inserted connection elements and, in consequence, provide completely adequate stability. Two connection elements are sufficient here, which are so connected to the worktop of the lower machine that they are introduced into the recesses in the facing supporting feet of the upper machine when the machines are aligned with each other. The configuration is preferably such that the two rear supporting feet of the attached machine each have associated therewith a connection element on the worktop of the lower machine.

The stability is further improved, according to one embodiment, in that the connection elements are introduced in a form-locking manner into the recesses in the supporting feet, which recesses are preferably continuous.

The attachment of the connection elements to the worktop of the lower machine is facilitated, in that the connection elements facing the lower machine are terminated by a mounting plate, which is connectable to the worktop of the lower machine.

If, according to one embodiment, the mounting plate is connectable to the worktop of the lower machine by means of a double-sided adhesive tape, the lower machine can have a completely sealed worktop, i.e. any washing machine or any automatic washing machine may be used for the washer-cum-drier stack. The same also applies to the drier, since the latter may be provided, if necessary, with appropriate supporting feet.

An additional securement for ensuring stability can be achieved, in that the supporting feet are terminated by an hexagonal adjusting means, and in that the mounting plate for the connection elements is provided with a stop spring which engages behind the hexagonal adjusting means of the associated supporting foot when the connection element is inserted.

The number of component parts required for the arrangement is kept very small, in that the connection element is configured as a one-piece plastics material injection moulded component part with the mounting plate and possibly with the stop spring. In addition, these plastics material injection moulded component parts are recyclable.

BRIEF DESCRIPTION OF THE DRAWINGS

The invention is explained more fully with reference to one embodiment illustrated in the drawing. In the drawing:

FIG. 1 is a schematic, perspective front elevational view of the domestic machines, which are to be stacked one above the other and have the stability achieved according to the invention; and FIG. 2 is a view, on an enlarged scale, of a supporting foot having the connection element adapted thereto.

DESCRIPTION OF THE PREFERRED EMBODIMENT

Referring to FIG. 1 and 2, for a washer-cum-drier stack, a washing machine or an automatic washing machine is installed as the lower machine 10. The upper machine 20 is configured as a drier and has four supporting feet 21, which are vertically displaceable.

In the embodiment, two connection elements 30 are provided on the worktop 11 of the lower machine 10, said connection elements protruding vertically upwardly and being aligned with the two rear supporting feet 21 of the upper machine 20. So that these connection elements 30 can be introduced into the supporting feet 21, said supporting feet are provided with recesses 22, which are preferably continuous, as FIG. 2 illustrates.

The connection elements 30 facing the lower machine 10 are provided with a mounting plate 31, which is connected to the worktop 11 of the lower machine 10. A type of connection which has proved to be very advantageous is one which provides a double-sided adhesive tape 32 on the connection side of the mounting plate 31. After the protective film has been removed, the mounting plate 31 of the connection element 30 can be adhered to the worktop 11 very easily. Since the pin-like connection element 30 is long enough for engagement with the recess 22 in the supporting foot 21, good stability is achieved, and such is further improved, in that the connection element 30 is introduced in a form-locking manner into the recess 22 in the supporting foot 21.

The connection element 30 may also, of course, be secured to the worktop 11 in a different manner, and four connection elements 30 may also be introduced into the four supporting feet 21 of the upper machine 20 without the stability being adversely affected.

The engagement connection between the connection element 30 and the supporting foot 21 may additionally be ensured when the mounting plate 31 is provided with a stop spring 33, which engages behind the hexagonal adjusting means 23 of the supporting foot 21 after the connection element 30 has been introduced into said foot. This locking connection can also be released again by deflecting the stop spring 33 when the upper machine 20 needs to be removed.

The connection element 30 may be configured and produced as a one-piece plastics material injection moulded component part with the mounting plate 31 and possibly with the stop spring 33 and constitutes a recyclable connection member.

I claim:

1. An arrangement for the stable connection of two domestic machines stacked one above the other, more especially a washing machine and a drier to form a washer-cum-drier stack, the arrangement comprising: the lower machine having an upper worktop and the attached machine having vertically displaceable supporting feet, wherein the supporting feet are provided with a vertical recess; at least two vertically protruding connection elements are connectable and connected to the worktop of the lower machine; the connection elements are introduced into the recesses of the supporting feet when the machines are aligned with each other and stacked one above the other; a locking device that locks at least one supporting foot to at least one connection element, wherein the supporting feet are terminated by a hexagonal adjusting means, the mounting plate for the connection elements is provided with a stop spring which engages behind the hexagonal adjusting means of the associated supporting foot when the connection element is inserted, and the locking device comprises the hexagonal adjusting means and the stop spring.

2. The arrangement according to claim 1, wherein the two rear supporting feet of the attached machine each have associated therewith a connection element on the worktop of the lower machine.

3. The arrangement according to claim 2, wherein the connection elements are introduced in a form-locking manner into the recesses in the supporting feet.

4. The arrangement according to claim 3, wherein the connection elements facing the lower machine are terminated by a mounting plate, which is connectable to the worktop of the lower machine.

5. The arrangement according to claim 4, wherein the mounting plate is connectable to the worktop of the lower machine by means of a double-sided adhesive tape.

6. The arrangement according to claim 5, wherein the connection element is configured as a one-piece plastic material injection moulded component part with the mounting plate and the stop spring.

7. The arrangement according to claim 1, wherein the connection elements are introduced in a form-locking manner into the recesses in the supporting feet.

8. The arrangement according to claim 1, wherein the connection elements facing the lower machine are terminated by a mounting plate, which is connectable to the worktop of the lower machine.

9. The arrangement according to claim 1, wherein the connection element is configured as a one-piece plastic material injection moulded component part with the mounting plate and the stop spring.

10. An arrangement for the stable connection of two stacked domestic appliances, the arrangement comprising:

a first domestic appliance having a worktop;

a second domestic appliance having a bottom, which abuts the worktop when the appliances are stacked;

at least two first connectors provided on the bottom, each first connector having a recess;

at least two second connectors provided on the worktop, each second connector corresponding to one of the first connectors and having a protrusion, which is received within the recess of the corresponding first connector when the appliances are aligned and stacked; and a locking device that locks at least one first connector to the corresponding second connector, wherein the first connectors comprise supporting feet, which are terminated by a hexagonal adjusting means, and the mounting plate is provided with a stop spring which engages behind the hexagonal adjusting means of the associated supporting foot when the post is inserted, and the locking device comprises the hexagonal adjusting means and the stop spring.

11. The arrangement according to claim 10, wherein the first connectors are vertically displaceable feet.

12. The arrangement according to claim 11 wherein the protrusions are vertically oriented posts.

13. The arrangement according to claim 12, wherein the protrusions of the second connectors are introduced in a form-locking manner into the recesses in the first connectors.

14. The arrangement according to claim 12, wherein the second connectors are terminated by a mounting plate, which is connectable to the worktop of the second appliance.

15. The arrangement according to claim 12, wherein the mounting plate is connectable to the worktop of the second appliance by means of a double-sided adhesive tape.

16. The arrangement according to claim 15, wherein the second connectors are configured as a one-piece plastic material injection moulded component part with the mounting plate and the stop spring.

* * * * *